United States Patent [19]

Drewett et al.

[11] 4,426,174

[45] Jan. 17, 1984

[54] EASILY REPLACEABLE SHOCK ABSORBER MOUNT FOR VESSEL BUMPER ON A MARINE STRUCTURE

[75] Inventors: Glen E. Drewett, P.O. Box 15, Negreet, La. 71460; Kenneth W. Guynes, New Caney, Tex.

[73] Assignee: Glen E. Drewett, Negreet, La.

[21] Appl. No.: 428,757

[22] Filed: Sep. 30, 1982

[51] Int. Cl.³ .......................... E02B 3/22; B63B 21/04
[52] U.S. Cl. .................................. 405/213; 114/220; 405/195
[58] Field of Search ............................... 405/211–215, 405/195; 114/219, 220

[56] References Cited

U.S. PATENT DOCUMENTS

| | | | |
|---|---|---|---|
| 2,199,333 | 4/1940 | Dunklin | 114/219 X |
| 3,564,858 | 4/1969 | Pogonowski | 405/212 |
| 3,585,958 | 6/1971 | Naczkowski | 405/215 X |
| 4,109,474 | 8/1978 | Files et al. | 405/213 |
| 4,137,861 | 2/1979 | Brummenaes | 114/219 |
| 4,345,537 | 8/1982 | Ueda et al. | 405/215 X |

*Primary Examiner*—Dennis L. Taylor
*Attorney, Agent, or Firm*—Jack W. Hayden

[57] ABSTRACT

An annular hollow support telescopically receives an annular hollow body in which is molded a longitudinally extending cylinder embedded in a frangible mass. The support includes an annular flange to seat and position the hollow body so that the hollow body projects longitudinally of and from the support and a surface is associated with the support to position the support on a marine structure so that the support projects laterally from the marine structure. Jack means are connected between the support and the annular hollow body for assisting in removing the annular hollow body and supported cylinder relative to the support.

2 Claims, 3 Drawing Figures

EASILY REPLACEABLE SHOCK ABSORBER MOUNT FOR VESSEL BUMPER ON A MARINE STRUCTURE

SUMMARY OF THE INVENTION

The present invention relates to an improvement in my U.S. Pat. No. 3,995,437. Such structure works quite well; however, it has been discovered that some expense and effort is involved in removing the shock absorbing arrangement from its submerged support on a marine structure. The present invention provides a support arrangement which enables the shock absorbing arrangement of my prior patent to be more readily positioned on or removed from a submerged portion of a marine structure in a water covered area for repair or replacement when desired.

Other objects and advantages of the present invention will become more readily apparent from a consideration of the following description and drawings.

DESCRIPTION OF THE PREFERRED EMBODIMENT

Figure 1:
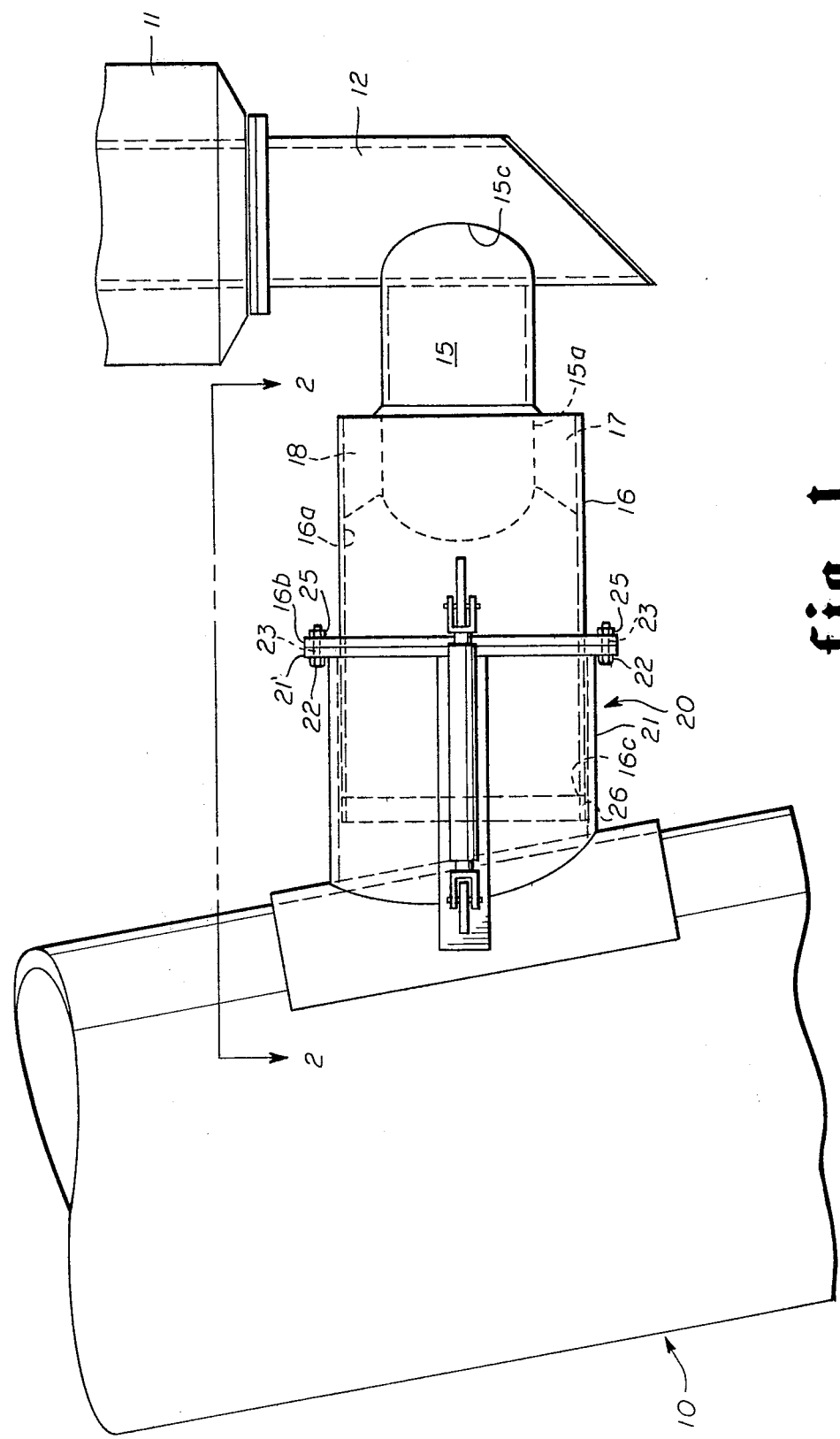
FIG. 1 is a side elevational view illustrating a portion of a jacket leg of a fixed structure in a water covered area and the lower end of a support for a barge bumper with the present invention extending between the jacket leg and the support for the barge bumper.
Figure 2:
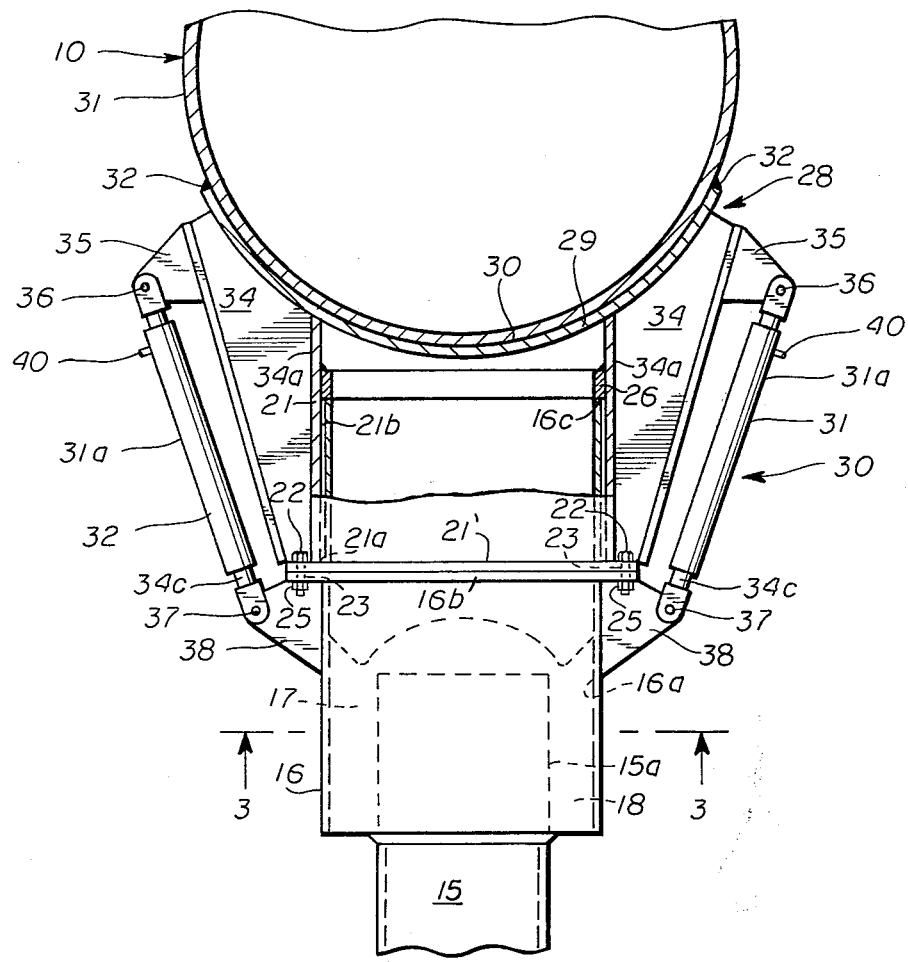
FIG. 2 is a view on the line 2—2 of FIG. 1 to more clearly illustrate the structural components and arrangement of the present invention.
Figure 3:
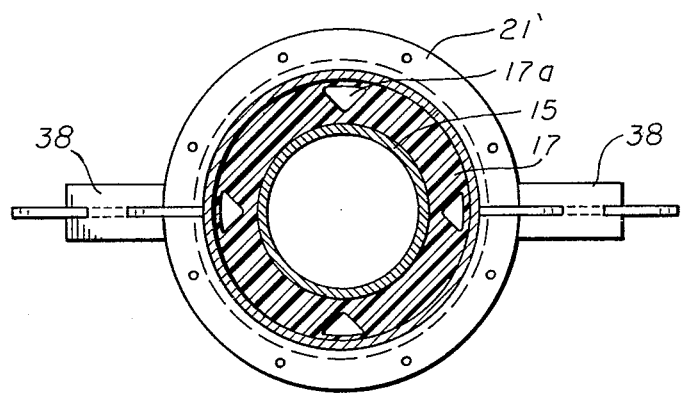
FIG. 3 is a sectional view on the line 3—3 of FIG. 2 to further illustrate the structural relationship of the components of the present invention.

Attention is first directed to FIG. 1 of the drawings wherein a marine jacket leg is referred to generally by the numeral 10. The marine jacket leg 10 extends vertically in a water covered area with its lower end adapted to be positioned on or extending downwardly into the earth's surface within the water covered area, with the jacket leg extending upwardly, normally at some angle as illustrated in FIG. 1 of the drawings. A plurality of such legs is arranged for support of a structure above the surface of the water in the water covered area.

It can be appreciated that it is necessary to move supplies and men to the structure, and this can be accomplished either by a floating vessel or barge means, or by helicopter means. When it is accomplished by a floating vessel means, a landing dock must be provided adjacent the structure in the water covered area for offloading or onloading of men, material and supplies in a manner so as to not cause damage to the marine structure or to the vessel or barge. An elastomer bumper 11 is mounted on a vertically extending support 12, with the lower end of such support being illustrated in FIG. 1 of the drawings. It can be appreciated that the support 12 extends upwardly through the bumper 11 and a trace extends between the support 12 and the leg 10 above the bumper 11 to retain the bumper in a generally vertically extending and spaced relationship relative to the leg 10 on which the landing dock is provided. In some instances, the brace extending between the structure leg 10 and the vertical support 12 includes or is formed by a shock absorbing arrangement as generally disclosed in U.S. Pat. No. 3,995,437. If the shock absorbing arrangement forms the bottom brace adjacent the lower end of the vertically extending support 12, it may be submerged beneath the water in the water covered area, and in some instances, the repair or replacement of such shock absorbing arrangement is somewhat difficult and may be time consuming and costly.

Such shock absorbing arrangement includes a cylinder 15 which is positioned longitudinally of and is telescopically received within an annular hollow body 16, there being a frangible mass 17 which extends in the annular space 18 between the cylinder 15 and the annular hollow body 16 and is bonded to the inner surface 16a of the annular hollow body 16 and the outer annular surface 15a of the cylinder 15. The frangible mass may comprise a urethane foam as illustrated or a suitable elastomer.

Support means referred to generally by the numeral 20 include an annular hollow member 21 for telescopically receiving the annular hollow body 16 as illustrated in the drawings. The support means 20 further includes the annular flange 21' adjacent the outer end 21a of the annular hollow member 21 against which the flange 16b formed on the annular hollow body 16 is seated. Bolts 22 extend through openings 23 in the flanges 21' and 16b for receiving nuts 25 thereon to secure the annular hollow body in position within the annular hollow member 21. The support means 20 further includes the annular ring 26 secured by suitable welding or the like on the interior surface 21b of the annular hollow member 21 for seatably receiving the end 16c of the annular hollow body 16. The flange 21' and annular ring 26 form what may be referred to as positioning means to position the annular hollow body 16 so that it projects longitudinally of and extends from the support means 20 as illustrated in the drawings.

The support means 20 further includes associated means referred to generally by the numeral 28 including the arcuate portion or member 29 which has a surface 30 thereon for closely fitting adjacent the conforming surface 31 on the leg 10. The member 29 may be secured to the leg 10 by any suitable means such as by welding as illustrated at 32. Secured to the member 29 by any suitable means such as by welding are the wing brackets 34 which extend laterally from the arcuate member 29 and in diametrically opposed longitudinal extending relationship adjacent the hollow tubular member 21. Such wing brackets 34 may be secured along their edges 34a to the hollow tubular member 21 by suitable means such as by welding and terminate in abutting relationship with the annular flange 21' on the hollow tubular member. Thus, the associated means comprising the member 29 and the wing brackets 34 position the support means 20 on the leg 10 of the marine structure so that it projects laterally therefrom.

In order to provide suitable means for assisting in removal of the shock absorbing arrangement comprising body 16 and cylinder 15 from the support means 20, suitable jack means referred to generally by the numeral 30 are provided which include the pair of jacks 31 and 32. The jacks 31 and 32 each comprise a cylindrical housing 31a with piston means (not shown) therein which are connected to a piston rod 34 extending from one end of the cylindrical housing 31a. The housing 31a of each of the jacks 31, 32 is secured at one end to a bracket 35 carried on the wing brackets 34 as shown. The housing 31a is preferably secured to the bracket 35 by means of the pivoted arrangement 36 to accommodate any movement of each of the housings 31a relative to the bracket 35 with which they are connected and the wing brackets 34. Each piston rod 34c is connected by pivot connection 37 to the bracket 38 mounted on the annular hollow body 16 as shown. Suitable connections 40 are provided in the cylindrical housings 31a for supplying operating fluid to each of the jacks whereby they may be actuated for removal of the annular hollow body 16 and cylinder 15 carried thereby from the support 20 when desired.

For example, when it is desired to remove the hollow body 16 with the cylinder 15 from the position shown in the drawings, a suitable pneumatic or fluid power souce can be connected to the connections 40 to supply power fluid to the cylindrical housings 31a to move the piston means therein and the piston rod 34c against the brackets 37, thus forcing the annular hollow body 16 and cylinder 15 carried thereby outwardly from the annular hollow member 21. In some instances, the shock absorbing arrangement may be difficult to remove from the annular hollow member 21 for any of a variety of reasons, and the present invention enables the shock absorbing arrangement to be more readily removed from the support means 20 eliminating or reducing the cost involved which might be substantial if marine divers were required to effect the dislodging.

The foregoing disclosure and description of the invention are illustrative and explanatory thereof, and various changes in the size, shape and materials as well as in the details of the illustrated construction may be made without departing from the spirit of the invention.

What is claimed is:

1. In a shock absorbing arrangement for a vessel bumper on a marine structure wherein an annular hollow body is provided with a longitudinally extending cylinder and there being a frangible means molded between the hollow body and the cylinder to position the cylinder in the body so that it is spaced from one body end and projects out of the other body end, the invention comprising:
   a. support means telescopically receiving the annular hollow body, said support means including positioning means to position the annular hollow body so that the hollow body projects longitudinally of and from said support means;
   b. associated means associated with said support means to position said support means on the marine structure so that the support means projects laterally from the marine structure; and
   c. jack means connected between said support means and the annular hollow body for removing and replacing the annular hollow body and supported cylinder relative to the support means.

2. The invention of claim 1 wherein said positioning means includes a surface for closely conforming with and abutting a surface on the marine structure
   and wherein said associated means includes an annular flange means which abuts and seats an annular flange on the annular hollow body
   and wherein said jack means includes a pair of jacks extending longitudinally of said support means and the annular hollow body with one end of each jack means secured to said support means and the other end secured to the annular hollow body.

* * * * *